United States Patent [19]

Pin et al.

[11] Patent Number: 5,002,738

[45] Date of Patent: Mar. 26, 1991

[54] MOVEMENT OZONE GENERATOR

[76] Inventors: Yu Pin; Yu H. Chean, both of Apartment Block 19,#04-211, Corporation Drive, Singapore 2261, Singapore

[21] Appl. No.: 487,585

[22] Filed: Mar. 2, 1990

[30] Foreign Application Priority Data

Mar. 29, 1989 [GB] United Kingdom ............. 8907044

[51] Int. Cl.⁵ .......................................... B01J 19/08
[52] U.S. Cl. ........................ 422/186.13; 422/186.07; 422/186.18; 422/186.19; 422/186.14
[58] Field of Search ............... 422/186.07, 186.18, 422/186.19, 186.13, 186.14

[56] References Cited

U.S. PATENT DOCUMENTS

| | | | |
|---|---|---|---|
| 3,942,020 | 3/1976 | Ciambrone | 250/539 |
| 4,234,800 | 11/1980 | Kenly, V et al. | 250/540 |
| 4,386,055 | 5/1983 | McBride | 422/186.18 |
| 4,832,918 | 5/1989 | Horikoshi et al. | 422/186.18 |

FOREIGN PATENT DOCUMENTS 792053 3/1968 United Kingdom .
2014411 9/1979 United Kingdom .

*Primary Examiner*—Stephen J. Lechert, Jr.
*Assistant Examiner*—Nina Bhat
*Attorney, Agent, or Firm*—Silverman, Cass & Singer, Ltd.

[57] ABSTRACT

An ozone generator comprising a body having a chamber, an inlet and an outlet to enable gas to flow through the body via the chamber, a primary electrode mounted within the chamber and a discharge electrode having one or more edge with a small radius of curvature, said discharge electrode being positioned adjacent and spaced from the primary electrode, wherein the discharge electrode is moveable to vary the position of electric discharge through the gas.

20 Claims, 3 Drawing Sheets

MOVEMENT OZONE GENERATOR

The present invention relates to an improved type of ozone generator.

Ozone is a well-known, powerful oxidising agent, but does not have many commercial applications due to its extremely high cost of manufacture.

The prior art manner of manufacture of ozone is primarily the ionisation of oxygen or an oxygen carrying gas by means of electrical discharge. The oxygen molecules are ionised and recombine into ozone molecules ($O_3$).

It is known to pass the oxygen through a high electric field produced by oppositely charged electrodes. One electrode is usually insulated to ensure that no sparking takes place through the gas. The oxygen molecules are ionised due to the leaking of the charge stored on the uninsulated electrode through the gas.

The present invention represents a considerable improvement on the prior art method of manufacture of ozone, incorporating an additional feature which vastly improves the output of the generator and hence reduces substantially the cost of production of ozone.

According to the present invention there is provided an ozone generator comprising a body having a chamber, an inlet and an outlet to enable gas to flow through the body via the chamber, a primary electrode mounted within the chamber and a discharge electrode having one or more edge with a small radius of curvature, said discharge electrode being positioned adjacent and spaced from the primary electrode, characterised in that the discharge electrode is moveable to vary the position of electrical discharge through the gas.

In a preferred embodiment of the present invention the primary electrode is mounted on an inside wall of the chamber and is insulated by means of a ceramic material. The ceramic material ensures that no sparking takes place between the discharge electrode and the primary electrode, thus allowing a far higher potential difference to be applied across the two electrodes. In this way, more oxygen molecules are ionised to produce a larger volume of ozone gas.

The edges of the discharge electrode are preferably approximately 1.5 inches (3.8 cm) from the primary electrode. The gas passes between these electrodes and therefore must pass through the multitude of ionisation curtains formed between the edges of the discharge electrode and the primary electrode.

The edges of the discharge electrode preferably move with a component of their motion in a direction substantially perpendicular to the planes of the ionisation curtains.

In one embodiment of the invention, the discharge electrode of the ozone generator is rotated by means of a motor. In this embodiment, the edges of the discharge electrode preferably form a helix along the electrode and as this rotates so the positions of the ionisation curtains vary. Hence, there is no build up of ionised gas in the immediate vicinity of the edges of the discharge electrode, since the edges are continuously moving through the gas.

In an alternative embodiment, the discharge electrode is substantially planar and is driven back and forth in its own plane, for example, on guide rails, suitably by means of a cam at one end and one or more springs at the opposite end. The guide rails ensure that the edges of the discharge electrode remain at a substantially fixed distance from the primary electrode.

Preferably, in use, the gas flow within the chamber is substantially perpendicular to the direction of discharge from the or each edge of the discharge electrode. Further, if the discharge electrode has at least two edges, the distance between adjacent edges is preferably 0.75 inches (1.9 cm) or less.

In use, one or more continuous electron curtain is preferably formed between the discharge electrode and the primary electrode.

In a preferred embodiment of the invention the number of edges which can discharge electrons is variable. It is also preferable that the energy generated by the discharge of electrons is defined by the equation $E = mc^2$.

It will, of course, be appreciated that an ozone generator according to the present invention may include one or more discharge electrodes and it is also possible that the primary electrode may be moveable. Further, a potential difference of between 16 kV to 25 kV is preferably applied across the discharge electrode and the primary electrode. However, this potential difference may be varied, depending on such factors as the gas pressure and temperature.

The body of the ozone generator is preferably made of a high density electrical insulator due to the high potential difference being applied within the body of the ozone generator.

Specific embodiments of the present invention are now described by way of example only with reference to the accompanying drawings in which.

Figure 1:
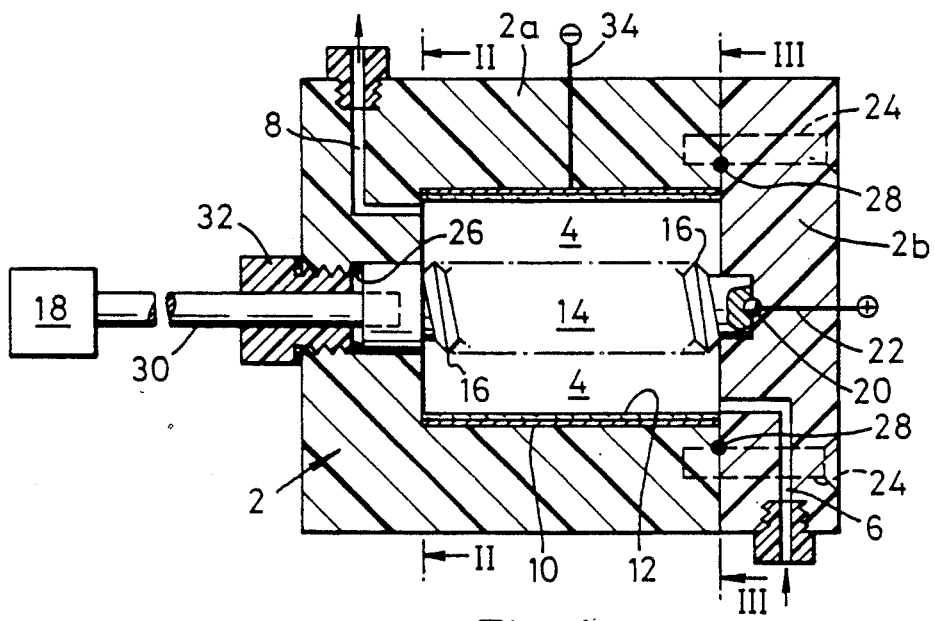
FIG. 1 is a longitudinal cross section of a first embodiment of the present invention.
Figure 2:
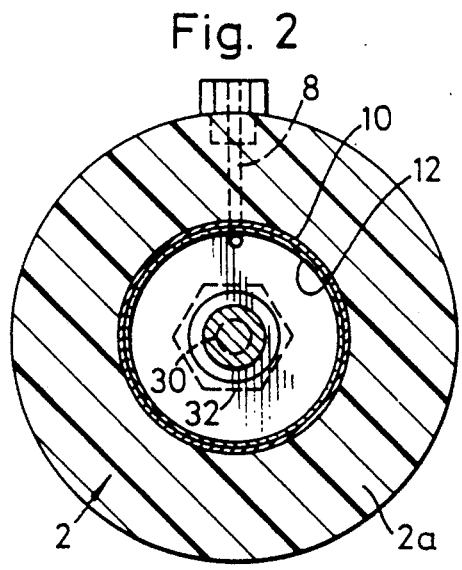
FIG. 2 is a rear transverse cross section of the ozone generator shown in FIG. 1.
Figure 3:
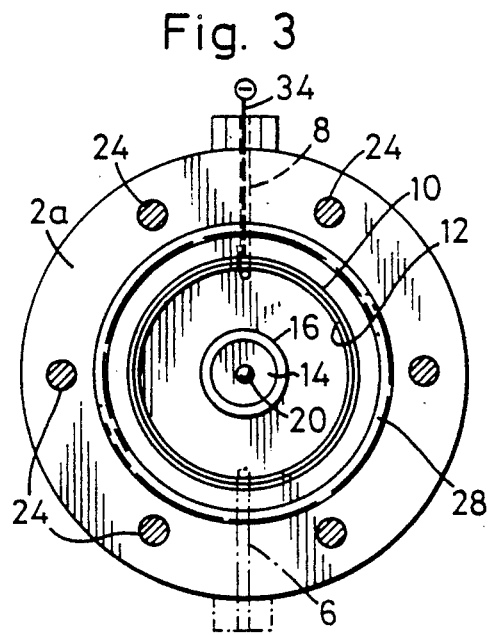
FIG. 3 is a front transverse cross section of the ozone generator shown in FIG. 1.

With reference to FIGS. 1, 2 and 3 of the drawings, an ozone generator comprises a body (2) having a chamber (4) through which gas may pass by means of an inlet (6) and an outlet (8). The chamber (4) has a primary electrode (10) mounted on its internal walls, the electrode (10) being electrically insulated by a ceramic material (12). A discharge electrode (14) is substantially cylindrical with a plurality of edges (16), each having a small radius of curvature, which join together to form a helix along the cylinder. The edges (16) are approximately 1.5 inches (3.8 cm) from the primary electrode (10).

The discharge electrode (14) is axially connected to a drive motor (18) which in use rotates the discharge electrode (14). The free end of the discharge electrode (14) bears against a ball bearing (20) which is in electrical contact with a power supply via a power line (22).

The body (2) is made in two parts (2a, 2b) which are held together by means of screws (24). The body is made from a high density insulator.

Seals (26, 28) made of polyproplene or the like prevent leakage of any gas from the chamber. The seal (26) is held in position around the drive shaft (30) by means of a Teflon plug (32) (Teflon is a Trade Mark).

The primary electrode (10) is electrically connected to earth by means of a high voltage cable (34). In this way, when a high voltage such as 16 kV to 25 kV is applied to the discharge electrode (14), a volumetric ionisation field formed by a multitude of ionisation curtains is generated between the two electrodes and the discharge from the discharge electrode (14) ionises the oxygen gas as it passes through the chamber (4).

In use, air is passed through a filter, a pump, a cooler, a condenser, a dryer and a nitrogen removal unit, prior to passing through the chamber (4) of the ozone generator. In this way, pressurized, clean oxygen enhanced air is passed between the discharge electrode (14) and the primary electrode (10) such that the ionisation field produced by means of the rotating edges (16) (which are at high voltage) ionises the oxygen molecules and enhances the formation of ozone. The ozone enriched gas then passes out of the outlet (8).

The rotation of the edges (16) within the chamber (4) greatly enhances the volume of ozone produced per unit volume of gas entering the chamber in comparison with prior art systems.

Figure 4:
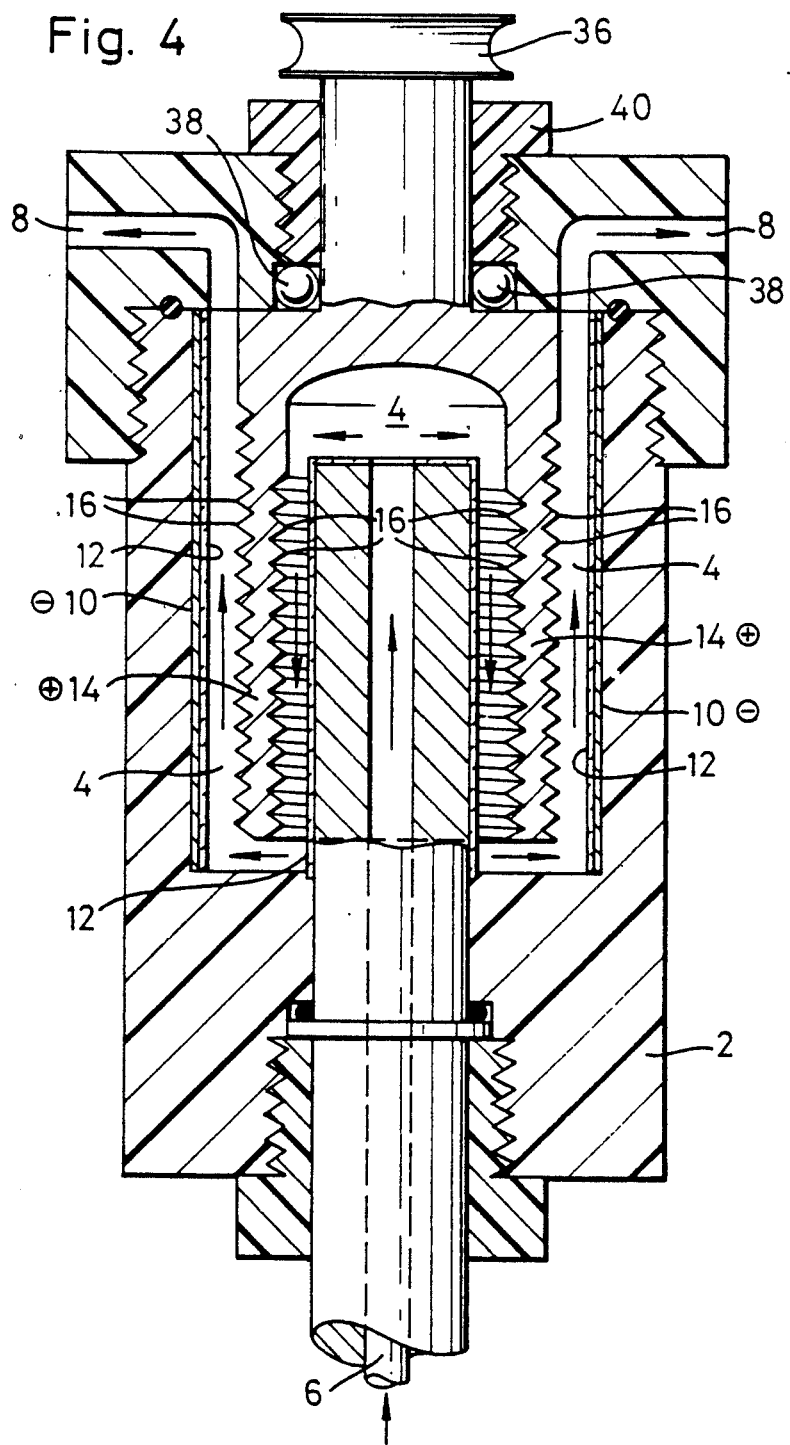
FIG. 4 is a longitudinal cross section of a second embodiment of the present invention.

FIG. 4 shows a second embodiment of the present invention in which two discharge electrodes (14) are rotated, by means of a pulley (36), within the chamber (4) of the body (2) of the ozone generator. In this instance each discharge electrode (14) does not rotate about its own axis, but about the axis about which the pulley (36) is rotated.

As in the first embodiment, the oxygen containing gas passes into the chamber (4) by means of an inlet (6) and is ionised within the chamber by the electrical discharge from the discharge electrodes (14). The ionised oxygen atoms then recombine to form ozone prior to leaving the chamber (4) by means of outlets (8).

To facilitate rotation of the discharge electrodes (14), the mounting for the electrodes bears against ball bearings (38) held in position by means of Teflon plug (40).

Figure 5A:
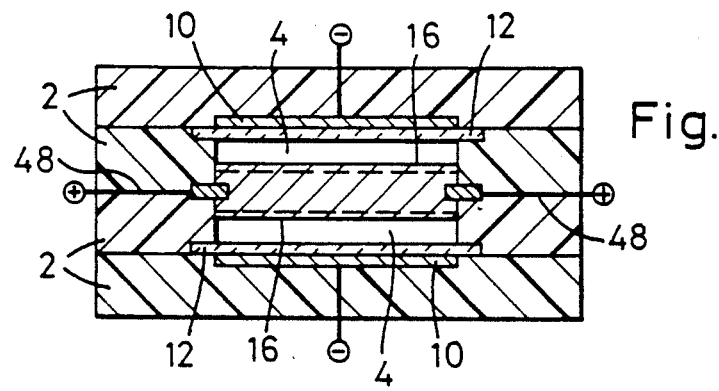
FIGS. 5a, 5b and 5c show a perspective, a plan and a side cross sectional view respectively of a third embodiment of the present invention.
Figure 5B:
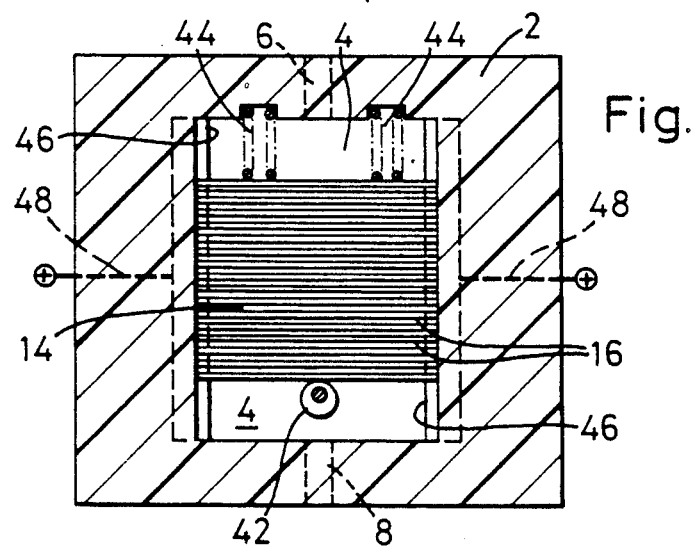
Figure 5C:
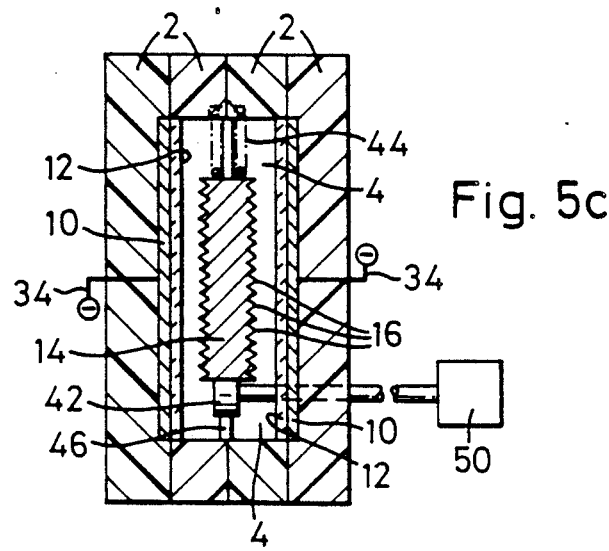

With reference to FIGS. 5a, 5b and 5c, a third embodiment of the present invention comprises a planar discharge electrode (14) having edges (16) from which electricity is discharged through the gas filled chamber (4) towards the primary electrode (10) mounted on the inner wall of the chamber (4). Movement of the discharge electrode (14), and hence the edges (16), in relation to the gas flow within the chamber (4) is achieved by means of a cam (42) (driven by motor (50)), which bears against one end of the discharge electrode (14), and springs (44) acting against the other end of the discharge electrode (14). Accordingly, the discharge electrode (14) is reciprocally moved within the chamber (4). Guide rails (46) ensure that the discharge electrode (14) remains aligned with the primary electrode (10), with the edges (16) approximately 1.5 inches from the primary electrode (10). The guide rails (46) are connected by means of high voltage cable (48) to a power supply. As previously, the ozone generator includes an input (6) and an output (8) for the gas flow, and a body (2) made of high density insulator. Further, the voltage applied across the two electrodes is in the region of 16 kV to 25 kV.

It will of course be understood that the present invention has been described above purely by way of example and that modifications in detail can be made within the scope of the invention.

We claim:

1. An ozone generator comprising a body having a chamber, an inlet and an outlet to enable gas to flow through the body via the chamber, a primary electrode mounted within the chamber and a discharge electrode having one or more edges with a small radius of curvature, said discharge electrode being positioned adjacent and spaced from the primary electrode and being movable to vary the position of the electric discharge through the gas, each edge being substantially perpendicular to the gas flow direction.

2. An ozone generator according to claim 1 wherein the primary electrode is mounted on an inside wall of the chamber.

3. An ozone generator according to claim 1 wherein the primary electrode is electrically insulated from the gas within the chamber.

4. An ozone generator according to claim 1 wherein the or each edge is approximately 1.5 inches (3.8 cm) from the primary electrode.

5. An ozone generator according to claim 1 wherein the discharge electrode rotates.

6. An ozone generator according to claim 1 wherein the or each edge of the discharge electrode forms a helix along the electrode.

7. An ozone generator according to claim 6 wherein the discharge electrode is rotated by means of a motor, the shaft of said motor being connected to the axis of the electrode.

8. An ozone generator according to claim 1 wherein the discharge electrode is substantially planar and is reciprocally moveable in its own plane.

9. An ozone generator according to claim 8 wherein the discharge electrode slides on guide rails.

10. An ozone generator according to claim 9 wherein the discharge electrode is driven in one direction by means of a cam and in the reverse direction by means of one or more springs.

11. An ozone generator according to claim 1 wherein, in use, the gas flow within the chamber is substantially perpendicular to the direction of discharge from the or each edge of the discharge electrode.

12. An ozone generator according to claim 1 wherein the discharge electrode has at least two edges and the distance between adjacent edges is 0.75 inches (1.9 cm) or less.

13. An ozone generator according to claim 1 wherein, in use, one or more electron curtain is formed between the discharge electrode and the primary electrode.

14. An ozone generator according to claim 1 wherein the number of edges discharging electrons may be varied.

15. An ozone generator according to claim 1 wherein the chamber accommodates a plurality of discharge electrodes.

16. An ozone generator according to claim 1 wherein a potential difference is applied across the discharge electrode and the primary electrode of between 16 kV to 25 kV.

17. An ozone generator according to claim 1 wherein the body is formed from high density insulator.

18. An ozone generator comprising a body having a chamber, an inlet and an outlet to enable gas to flow through the body via the chamber, a primary electrode mounted within the chamber and a discharge electrode having one or more edges with a small radius of curvature, said discharge electrode being positioned adjacent and spaced from the primary electrode and being movable to vary the position of the electric discharge through the gas, each edge being approximately 1.5 inches (3.8 cm) from the primary electrode.

19. An ozone generator comprising a body having a chamber, an inlet and an outlet to enable gas to flow through the body via the chamber, a primary electrode mounted within the chamber and a discharge electrode having one or more edges with a small radius of curvature, said discharge electrode being positioned adjacent and spaced from the primary electrode and being movable to vary the position of the electric discharge through the gas, said discharge electrode being substantially planar and reciprocally movable in its own plane slidable on guide rails.

20. An ozone generator comprising a body having a chamber, an inlet and an outlet to enable gas to flow through the body via the chamber, a primary electrode mounted within the chamber and a discharge electrode having one at least two edges with a small radius of curvature, the distance between adjacent edges being approximately 0.75 inches (1.9 cm) or less, said discharge electrode being positioned adjacent and spaced from the primary electrode and being movable to vary the position of the electric discharge through the gas.

* * * * *

UNITED STATES PATENT AND TRADEMARK OFFICE
CERTIFICATE OF CORRECTION

PATENT NO. : 5,002,738
DATED : March 26, 1991
INVENTOR(S) : Yu Pin and Yu Hsien Cheng It is certified that error appears in the above-identified patent and that said Letters Patent is hereby corrected as shown below:

ON TITLE PAGE: ITEM [76]

Change the second inventor's name to read:

Yu Hsien Cheng

Signed and Sealed this

Fourth Day of August, 1992

Attest:

DOUGLAS B. COMER

*Attesting Officer*     *Acting Commissioner of Patents and Trademarks*